UNITED STATES PATENT OFFICE.

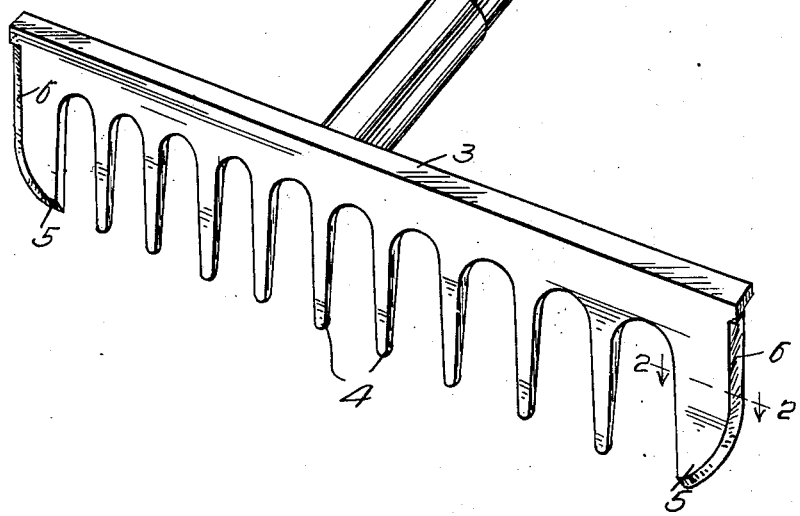

HERNAN D. MONEY, OF OCEAN SPRINGS, MISSISSIPPI.

COMBINED RAKE AND HOE.

1,189,987.

Specification of Letters Patent.

Patented July 4, 1916.

Application filed June 24, 1915. Serial No. 36,083.

*To all whom it may concern:*

Be it known that I, HERNAN D. MONEY, a citizen of the United States of America, and resident of Ocean Springs, in the county of Jackson and State of Mississippi, have invented certain new and useful Improvements in Combined Rakes and Hoes, of which the following is a specification.

This invention relates to rakes and particularly to a combined rake and hoe, the said invention having for its object the provision of a rake which is of combined utility in that the end teeth have sharpened edges which may be utilized as a hoe, the said end teeth being of durable construction and of such configuration as to not materially interfere with their action as rake teeth.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a perspective view of a rake showing a fragment of the handle; and Fig. 2 illustrates a sectional view on the line 2—2 of Fig. 1.

In these drawings 3 denotes the head of the rake and 4 the intermediate teeth and by the term "intermediate" I mean those teeth which are between the end teeth.

The end teeth 5 are of the same general construction and their outer edges 6 are beveled to form a blade so that when the rake is turned on its end, these end teeth will constitute hoe blades which will be of utility in breaking lumps of earth, in hilling plants or in removing weeds. In fact, it can be employed in any capacity where a hoe would be of utility and the fact that the end teeth have their edges curved and that the cutting edge extends to the point permits the use of this device in close proximity to the plant or vegetation being cultivated and by reason of the fact that the tooth tapers, it can be made to penetrate the earth without exerting unusual force during its manipulation. The head 3 may be connected to the handle 7 in any appropriate way. By reason of the fact that the teeth are relatively wide at the junction with the head they will not bend toward the adjacent teeth closing the gaps between the teeth.

I claim—

In a combined rake and hoe, a substantially wide head, said head having cut out portions forming end teeth and intermediate teeth, the end teeth being substantially wide and the outer edges thereof being straight substantially half their length, the remaining portions thereof being curved and merging with the points, each of said end teeth having their edges beveled throughout their lengths to form cutting blades, and the side faces of said end teeth being parallel with the side faces of the intermediate teeth.

In testimony whereof, I affix my signature in the presence of witnesses.

HERNAN D. MONEY.

Witnesses:
F. M. WEED,
A. EGLIN,
B. O. BAILEY.